United States Patent [19]
Hogan

[11] Patent Number: 5,933,597
[45] Date of Patent: Aug. 3, 1999

[54] METHOD AND SYSTEM FOR SHARING OBJECTS BETWEEN LOCAL AND REMOTE TERMINALS

[75] Inventor: Michael Hogan, Pflugerville, Tex.

[73] Assignee: VTEL Corporation, Austin, Tex.

[21] Appl. No.: 08/627,365

[22] Filed: Apr. 4, 1996

[51] Int. Cl.⁶ .................................................. G06F 15/16
[52] U.S. Cl. .............................. 395/200.34; 395/200.31; 395/200.35
[58] Field of Search ......................... 395/200.34, 200.47, 395/200.35, 200.31, 200.43; 345/330, 331, 332; 711/147, 150, 152, 159; 707/10, 101, 103, 104, 511, 512, 515, 521

[56] References Cited

U.S. PATENT DOCUMENTS

| | | | |
|---|---|---|---|
| 5,452,299 | 9/1995 | Thessin et al. | 379/158 |
| 5,544,300 | 8/1996 | Skarbo et al. | 395/157 |
| 5,613,124 | 3/1997 | Atkinson et al. | 395/133 |
| 5,649,105 | 7/1997 | Aldred et al. | 395/200.34 |
| 5,694,544 | 12/1997 | Tanigawa et al. | 395/200.34 |
| 5,701,484 | 12/1997 | Artsy | 395/683 |
| 5,724,508 | 3/1998 | Marple, Jr. et al. | 395/200.34 |
| 5,742,670 | 4/1998 | Bennett | 379/142 |
| 5,754,765 | 5/1998 | Danneels et al. | 395/200.34 |
| 5,764,901 | 6/1998 | Skarbo et al. | 395/200.34 |

*Primary Examiner*—Mehmet B. Geckil
*Attorney, Agent, or Firm*—Baker & Botts, L.L.P.

[57] ABSTRACT

An object sharing application provides a method and system for sharing an object (20) in a teleconference communications environment (10). The invention includes the steps and instructions for establishing a teleconferencing session between a source terminal (12) and a destination terminal (14). Then, the invention identifies object (20) having at least one link (36) to a source terminal application program (120, 122, 124) associated with the source terminal (12) occurs. The steps and instructions also include sharing the object between the source terminal (12) and the destination terminal (14) during the teleconferencing session without sharing the source terminal application program (120, 122, 124) from source terminal (12). As a result, the destination terminal (14) may associate the object (20) with at least one destination terminal application program (120, 122, 124) the at least one destination terminal application program (120, 122, 124) being separate from the source terminal application program (120, 122, 124).

30 Claims, 7 Drawing Sheets

METHOD AND SYSTEM FOR SHARING OBJECTS BETWEEN LOCAL AND REMOTE TERMINALS

TECHNICAL FIELD OF THE INVENTION

The present invention relates to video telecommunications methods and systems that include visual and audio communications and, more particularly, to a method, apparatus, and system for sharing objects of application programs from a local or source terminal to a remote or destination terminal.

BACKGROUND OF THE INVENTION

In recent years, communication technologies that make videoconferencing and other advanced teleconferencing applications practical have advanced significantly. At the same time, costs for these advanced technologies have rapidly decreased. By using systems that make possible videoconferencing or other multimedia or multicomponent teleconferencing, an entire company may meet to discuss strategies for trading, marketing and hiring without hotel reservations, flight delays, stopovers, meal expenses and those dreaded urban cab rides. For affordable amounts of money, a company having geographically dispersed offices, can link nationally and globally for impromptu corporate-wide meetings or simply communication sessions between two individuals at different offices. Multicomponent teleconferencing enhances communications and gives more consistent service and products. In addition, these technologies permit people to work in groups and global teams, to look at business in a global perspective, as well as do other important tasks.

Not only do advanced teleconferencing systems such as videoconferencing systems reduce some travel costs, but they also increase the frequency of meetings. Before these technologies existed, people could only meet face-to-face annually. However, with such conferencing capabilities, people can meet more frequently. Advanced teleconferencing systems make communications more like a meeting, so that people seem to be all in the same room.

As a result of the increased attractiveness and business acceptance of advanced teleconferencing systems, technological advances are occuring at ever-increasing rates. While advances to teleconferencing systems proceed, one of the major limitations in the systems relate to the transfer of information other than the audio and video images during the teleconference.

A known method of communicating data during multi-component teleconference is whiteboarding. The whiteboarding process simply sends a bitmap image back and forth from a source terminal to a destination terminal. The limitations associated with whiteboarding include the fact that there is no practical way to change the bitmap. While it may be possible to draw on the bitmap at the destination terminal, whiteboarding does not provide the ability to manipulate the data that the bitmap contains. In essence, whiteboarding does not provide a functional image at the destination. This is because there is no way to link the image back to a given application.

For those processes that permit sharing of data that is tied to an application program, the requirement exists of sharing the application that supports the data. Sharing the application, however, is a computationally intensive and limiting process. This is because sharing the application involves sharing the input devices such as a mouse or keyboard. The problem that occurs in this scenario is that the users compete for access to the application using one or more input devices. The result is that during a teleconference, the give and take that must occur to share the input devices inputs in many ways distracts from the content and communication that occurs during the teleconference.

SUMMARY OF THE INVENTION

The present invention provides a method and system for sharing an object in a teleconferencing communications environment that overcomes or substantial reduces limitations of known methods and systems for sharing information between a source terminal and a destination terminal.

According to one aspect, the present invention includes the steps and instructions for establishing a teleconference session between a source terminal and a destination terminal. Then, the invention identifies an object that includes a plurality of attributes, the object having at least one link to a source terminal application program. The steps and instructions of the present invention also include sharing the object between the source terminal and the destination terminal during the teleconferencing session without sharing the source terminal application program from the source terminal. As a result of the invention, the destination terminal may associate the object with at least one destination terminal application program. The destination terminal application program is separate from the source terminal application program.

As used herein, the term "teleconference" refers to any form of communicating from one or more local location to one or more remote locations. In particular, for present purposes, teleconferencing includes videoconferencing, multi-component audio conferencing, or other communications or conferencing methods that a given telecommunications system may permit. Moreover, the present invention has application over a wide variety of transmission media, such as the Internet or other information transformation infrastructure. The present invention is not bound to a transport mechanism. It is only bound to both ends of associated communications system.

A technical advantage of the present invention is that it provides a way to bind data and presentation information into a single compound object. The present invention provides a way to include that object within a series of compound objects to create a compound file. This permits sending the compound files back and forth between the source terminal and the destination terminal. The compound file includes all of the information necessary to regenerate and re-edit the object that the source terminal and destination terminal communicate. With the present invention, the source terminal may send an object to the destination terminal. Likewise, the destination terminal may send an object back to the source terminal. During a teleconferencing or similar remote communication scenario, the present invention makes this two-way object communication possible.

Another technical advantage of the present invention provides is the ability to create a visual representation of an object from a source terminal to a destination terminal. By inserting the data into a compound object, the present invention sets the data in a manner similar to that of inserting data into a clipboard and then dragging and dropping it from one place to another. The difference with the present invention, however, is that instead of dragging and dropping it to create data in an operating system, the present invention creates a compound object that may be created on the destination terminal. The present invention makes it possible to separate a compound object or file down to its lowest common denominator, which is a stream. The present invention sends just the stream from the source terminal to the destination terminal. At the destination terminal, the present invention associates the transmitted stream with a compound object to create a compound object that includes the stream at the destination terminal. As a result, the user at the destination terminal may render the compound object at the destination terminal without the need of the originating application.

Another technical advantage of the present invention is that it eliminates the need to share applications between the source terminal and the destination terminal. The source and destination terminals share only the stream of data, which is is the lowest common denominator at the source terminal. Accordingly, the destination terminals processor may operate its own application or may operate a different application, while sharing the data that resides at the source terminal.

Yet another technical advantage of the present invention is that it provides the ability to edit data in a time-efficient manner and with an acceptable level of security. The present invention makes it possible to choose to edit data in a teleconferencing environment, without the data having to leave the source terminal. The destination terminal may manipulate the data that it receives. In turn, the destinatiion terminal may transmit the shared data back to the source terminal.

Still another technical advantage that the present invention provides is a much simpler way to share data. With the present invention, there is no need to launch a first application program that uses the data and then launch a second application to share the first application. Nor is there the need to further launch at the destination terminal a third application for using the data and yet a fourth application that shares the application that uses the data.

With the present object sharing application, all that is necessary is to begin the object sharing application. The user knows what the object sharing application is to share. It is the application that includes the data that is to go to the destination terminal. With a single click of an input device such as a mouse or other input device, the present object application eliminates the need to launch the application in a mode that shares file data. It also eliminates the need to launch the application at the destination terminal as well as to launch the application that shares applications at the destination terminal. Because of its simplicity, the present invention has valuable use in a teleconferencing scenario. But moreover, the present object sharing application has use in practically any scenario or environment that shares data between a source terminal and a destination terminal.

Another technical advantage of the present object sharing application, therefore, is its use in various remote communication scenarios. For example, in an Internet application, users may desire to share applications from a source terminal to a destination terminal. The present invention makes this possible by simply sharing the object from the source terminal to the destination terminal. The destination terminal may or may not launch the application to which the data relates. The user at the destination terminal may take the object and embed it into another document or otherwise manipulate the object that it receives. Accordingly, the present invention provides for simple remote communication and sharing of objects between a source terminal and a destination terminal.

Still other technical advantages of the present object sharing application are that the various application programs that may be at the source terminal and the destination terminal may be presentation application programs such as a PowerPoint® application program, or even a Microsoft® Word®, EXCEL®, or Lotus 1-2-3® application program. The present invention works well with identical application programs reside at the source terminal and at the destination terminal. On the other hand, the present invention also works well when there are two different application program at the source and destination terminals. For example, the source terminal may use Microsoft® EXCEL® financial spreadsheet program. The destination terminal, on the other hand, may use the Lotus 1-2-3® spreadsheet program. As long as the source terminal application program and destination terminal application program can use the same type of data, the present object sharing application makes it possible to communicate the same object from one application program of one type at the source terminal to another application program of a different type at the destination terminal.

Still another technical advantage is that, because the present invention permits manipulation of the object at both the source and the destination terminals, much more use of the data is possible than with prior art methods and systems. For example, at the source terminal the object may be that for a three-dimensional graph that displays a certain type of data. On the other hand, the user at the destination terminal may desire to use the data to develop a bar chart. Because the present invention shares the object and not the application, it is significantly easier at the destination terminal for the user to do whatever the user may desire to do with the data at the destination terminal. The user may manipulate the data and, for example, create a bar chart from a three-dimensional graph. Then the user may send the bar chart to the source terminal user. The source terminal user, in turn, may take the bar chart and use the object as a bar chart or as a three-dimensional chart or as some other type of chart, such as a pie chart, for example, and manipulate the object by embedding it into another object or do whatever the user may decide with the object from the destination terminal. Obviously, the different uses that the object has are significantly greater than is possible with prior art methods and systems.

BRIEF DESCRIPTION OF THE DRAWINGS

For a more complete understanding of the present invention and the advantages thereof, reference is now made to the following description which is to be taken in conjunction with the accompanying drawings in which like reference numerals indicate like features and wherein.

DETAILED DESCRIPTION OF THE INVENTION

Preferred embodiments of the present invention are illustrated in the FIGUREs like numerals being used to refer to like and corresponding parts of the various drawings.

Figure 1:
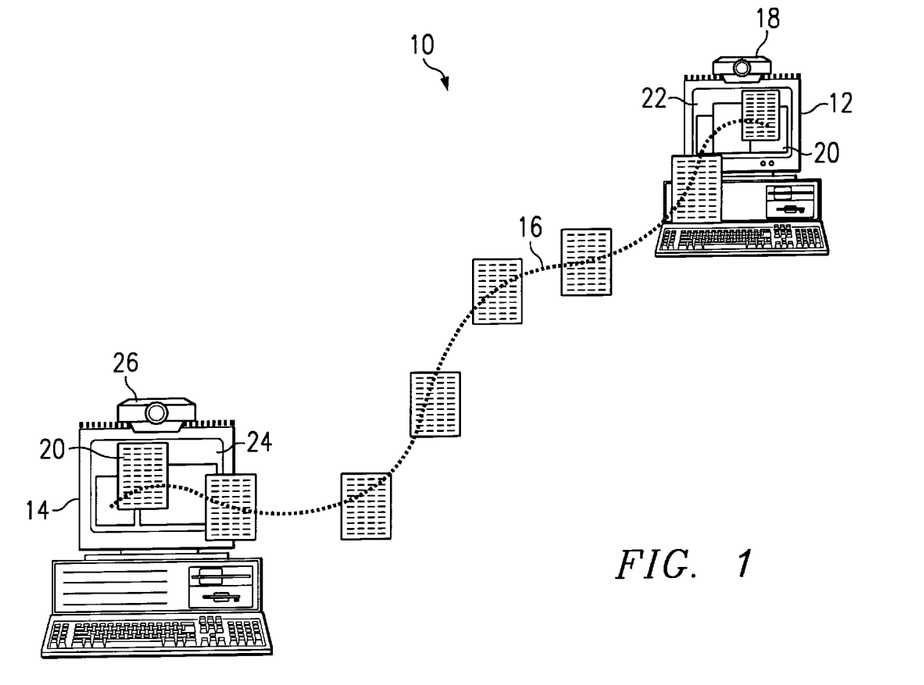
FIG. 1 conceptually depicts one aspect of the object sharing application of the present invention.

FIG. 1 depicts data flow diagram 10 that includes source terminal 12 and destination terminal 14. Dotted line 16 conceptually depicts a network or connection between source terminal 12 and destination terminal 14. Source terminal 12 also includes camera 18 and object 20 that appears on screen 22. As FIG. 1 indicates, the present object sharing application provides a way to transmit object 20 along communication path 16 to destination terminal 14. The result is that object 20 appears on screen 24 of destination terminal 14. Destination terminal 14, like destination terminal 12, includes video camera 26 to permit teleconferencing between source terminal 12 and destination terminal 16.

The present object sharing application goes beyond screen sharing, and then further beyond application sharing, to permit users to share objects in a manner similar to that in which a user employs objects in a personal computing context, but as applied to the video conferencing scenario. The object sharing method and system of the present invention provide the user the ability to share an object that is linked to an application without having also to share the entire application.

The object sharing method and system of the present invention, provides a way to display presentations via the video medium. Before placing a call, a user may queue up objects in the object sharing window that the present embodiment provides. In the object sharing window, objects become ready for easy use during the teleconferencing session. Alternatively, the present object sharing application provides the ability to drag objects directly from an application to a window that the object sharing system provides during a call. Moreover, the present invention provides a way to store objects from various applications in a single object storing window. For example, with the present object sharing application it is possible to store slides from a presentation application such as PowerPoint®, a financial statement using the EXCEL® application program, or a Microsoft® Word® document. Then, during a call, the present embodiment makes it possible to drag each item out of the window for the object sharing application and into the window for object sharing as the user desires the object. The user at the destination terminal may save items from the window of the user at the source terminal for future use.

Figure 2:
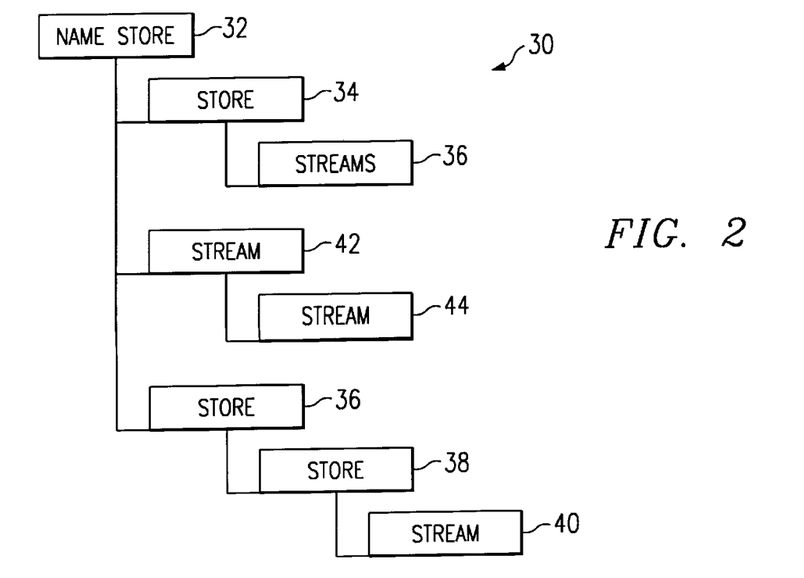
FIG. 2 describes the characteristics of a name store that the present invention uses.

The present object sharing application makes use of store and stream notations that associate with data in an object-oriented operating system. FIG. 2, for example, shows the use of a name store hierarchy using hierarchical diagram 30. Hierarchical diagram 30 includes name store 32 to which may attach various stores such as store 34 and store 36. A stream or set of streams 36 may attach to a store. Alternatively, a store 38 may attach to another store. A stream 40 may yet attach to store 38. Stream 42 may, for example, attach to or associate with name store 32 and yet another stream 44 may attach to stream 42. Generally, however, a store may not attach to a stream.

The present invention provides a mechanism for binding data and presentation information into a single compound object. Then, the present method and system provide a mechanism for including a single compound object within a series of compound objects to create a compound file. The present object sharing application provides for sending compound files between a source terminal and a destination terminal, and vice versa. The compound file includes all of the information necessary to regenerate or re-edit the object that contains the desired data between a source terminal and a destination terminal.

As FIG. 2 depicts, a compound file includes a directory tree that at the top includes name store 32. Beneath name store 32 are a series of streams. Each stream may itself be a store or a series of streams. In general, however, a store may hold streams but streams may not themselves hold stores. These may occur at any level. The result is a defined set such that for every name of a file there is either a store or a query to a store.

As a result of the store there is knowledge of how to implement a given stream. In every stream there is some type of data that could be used in an object. The present invention provides a way to bind all of the information that associates with a given name store such as name store 32 together. Because the present object sharing application provides a class identifier that associates with the name store, all the stores that associate with the name store may be identified.

The class identifier is registered through a data base under the object-oriented operation system such as Windows 95® or Windows NT®. This permits taking up the data and getting back the data to create an application that is based on the class identifier. As a result of this mechanism, it is possible to operate an application at a source terminal and a destination terminal and transmit from the source terminal to the destination terminal only the data within the object that is of interest between the source terminal and the destination terminal.

Figure 3:
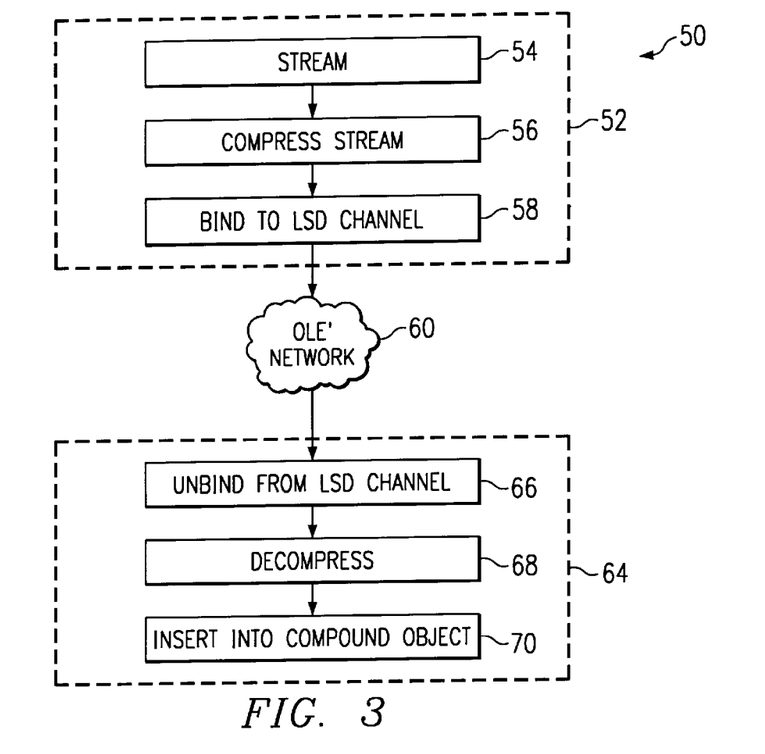
FIG. 3 depicts the flow of a shared object according to the present invention.
Figure 4:
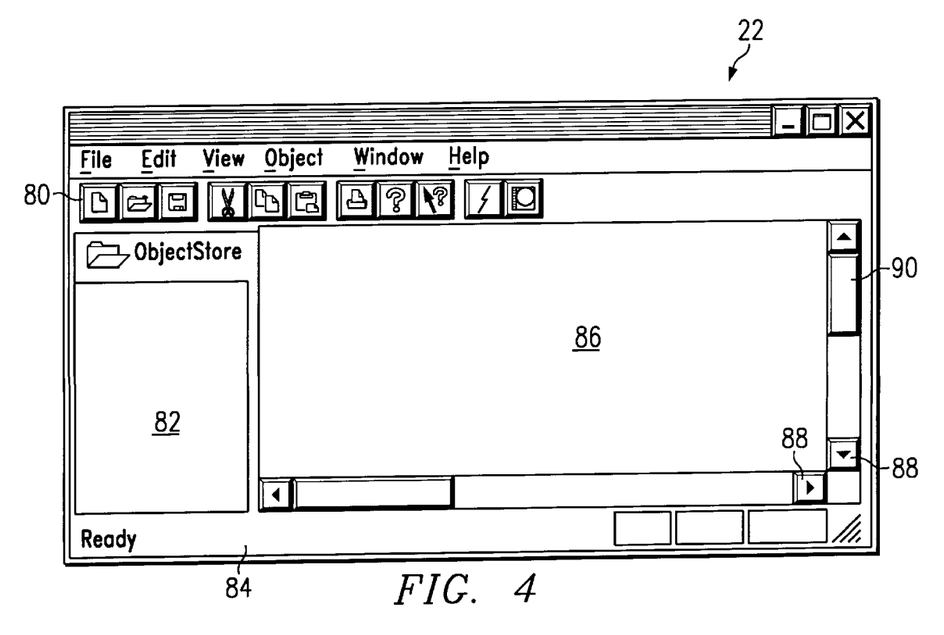
FIG. 4 shows an exemplary screen according to one aspect of the present invention.

FIG. 3 shows data flow diagram 50 to illustrate the flow of an object from the source terminal to the destination terminal. Conceptually, dash line box 52 indicates operations that may occur at source terminal 12, for example. Source terminal 12 may take a stream in the form of name store 32, as step 54 depicts and compress that stream, at step 56.

Step 58 takes the compressed stream arising from step 56 and binds the compressed stream to an LSD channel. The LSD channel of the FIG. 3 embodiment is particular to the described application. Other embodiments may include WINSOK®, TCP/IP, or other types of channel protocols. The particular type of channel protocol does not matter for purposes of the present invention. The LSD channel of the FIG. 3 embodiment, however, may be an H3-20-LSD channel.

Via the LSD channel, process flow 50 proceeds to OLE® network 60 which transmits the bound object to the destination terminal, for example, destination terminal 14 as dash line box 54 depicts. Within destination terminal 14 step 66 first occurs to unbind the object from the LSD channel. Then, at step 68 the compressed stream arises using a decompression algorithm. Step 70 illustrates the step of taking the decompressed stream and inserting the decompressed stream into a compound object at destination terminal 14.

The present invention, therefore, may take something that is on a disk or a single object as opposed to using the compound file, such as compound file 30 of FIG. 2, and permits the streams to be transmitted from source terminal 12 to destination terminal 14. By taking the streams as a portion of the object, the present object sharing application may compress the stream portion using a sliding window type of compression algorithms. The sliding window compression algorithm may be, for example, the compression algorithm known commercially as PKZIP®. The result is a compressed file that goes through the OLE® network to destination terminal 14 from which destination terminal 14 unbinds the compressed stream, decompresses it and then inserts the decompressed file into a compound object.

By inserting the decompressed file into a compound object, the present invention creates a visual representation at destination terminal 14. This sets the data similar to that of inserting the data off of a clipboard or "dragging it and dropping it", to use conventional Windows 95® terminology. Instead of dragging and dropping according to the Windows 95® methodology, the present object sharing application creates a compound object that the object-oriented operating system creates at the screen 24 destination terminal 14.

The present invention, by separating the streams from a compound file, and then sends just the streams, permits identifying the associated compound object at destination terminal 14. The operating system at destination terminal 14 then may create a compound object from these sent streams. The destination terminal 14 object-oriented operating system may render the compound object using the unbound and decompressed stream at destination terminal 14.

At the destination terminal, while it is necessary to have the object sharing application, it is not necessary to have the specific application program that corresponds to the object at the source terminal. It may be possible to use a different application program that understands data that the unbound and decompressed object contains. For example, at source terminal 14, the supporting application program may be Freelance Graphics®, while the destination terminal 14 application may be Microsoft® EXCEL®. As long as Microsoft® EXCEL® understands the object from Freelance Graphics®, the object sharing application program of the present invention successfully operates.

The present object sharing application uses the rendering engine of the source terminal application program to render the image or document, for example, object 20 of FIG. 1, on screen 22. When the user desires to point, the present invention looks at the class identifier and determines which application program created the object. It determines the originator of the object and then goes to the corresponding application at the destination terminal to render a window at the destination terminal. If an application does not exist at destination terminal 14, the present embodiment permits binding a meta-file in with the original data. This permits representing the object on any machine, irrespective of who created the original object. As a result, this additional feature avoids the need to have the application program on the destination terminal.

The destination terminal should be compatible with an OLE® network. Because the destination terminal uses OLE®, it understands how to look for a class identifier that associates with the unbound and decompressed object.

In implementing the present embodiment, it is important to understand the concept of a client item for creating a file from a client item. With the present object sharing application, the object is dropped into an interface for going to a destination terminal. The destination terminal determines whether it is capable of reading the object itself by making calls to the operating system. The destination terminal determines whether the object may be rendered on the destination terminal screen or whether it is necessary to create a disk file for the unbound and decompressed object.

In order to transfer the bound and compressed object from source terminal 12 to destination terminal 14, the system needs to know the ability to render the object at destination terminal 14. For example, using Microsoft® EXCEL®, a meta-file may communicate inside a stream that is rendered. As a result, using Microsoft® EXCEL®; it may not be necessary to render the palette at the destination terminal. Nonetheless, there is the need to know how to capture an image at the source terminal 12 in a format that is universally displayable and not dependent on either their being a VGA or other application program for rendering the object at destination terminal 14.

In essence, therefore, there is the need to have enough information relating to the object to permit transferring it and grabbing it globally in an OLE® or similar network. The transport mechanism that the present invention preferably uses is implemented under the H-320-LSD channel. This permits transferring over an IPX type of format such as a TCP/IP network protocol stack. In other words, the present object sharing application preferably has the ability to make a multi-way or point-to-point transfer of a compressed and bound object.

Although the present invention may transfer files from one place to another, the present object sharing application simply sends bytes of information from one point to another. There is no need to specifically connect the bytes to a given file location at source terminal 12 or destination terminal 14. Moreover, the different methods of transferring an object from source terminal 12 to destination terminal 14 may be employed for the present invention.

The present object sharing application provides innovative ways to present data. Supposes for example, that source terminal 12 possesses a given application program, such as, for example the EXCEL® application program, but destination terminal 14 does not possess the EXCEL® application program. If a user at source terminal 12 creates an object for transmitting to destination terminal 14, the object sharing application of the present invention, permits viewing the data that the shared object contains. Moreover, the present object sharing application permits the user at destination terminal 14 to further share the data of the shared object with yet a third party at a third terminal. This is possible using the present invention, even though destination terminal 14 may not possess the EXCEL® application program. The present invention, therefore, binds in the ability to share the object over the communications link.

To achieve the sharing of the object, the present invention takes a metafile snapshotof the image at the time the object is rendered to to the user. When the user drags and drops the object into the object sharing appliction from the originating application program at source terminal 12, the present invention forms the metafile snapshot. The object sharing application of the present invention holds on to the metafile snapshot so that, if at a later date the object sharing application is not available to render the object, destination terminal can still create the visual image of the object. This aspect of the present invention, however, does not allow the user to edit the shared object or drag and drop it without using either the application program at destination terminal 14 or otherwise supporting the shared object with an applicable application program.

For illustrative purposes, FIGS. 4 through 15 illustrate the various parts of graphical user interfaces that make the present object sharing application easy to use, as well as describing the various types of operations that the present invention provides. Accordingly, referring to FIG. 4, there appears screen 22 that may appear at source terminal 12. Screen 22 includes toolbar 80 that provides shortcuts to popular commands that may appear with a given object-oriented operating system. Graphical user interface 82 provides a window for creating presentations using the object sharing application of the present object sharing application. Moreover, status bar 84 provides information relating to the object sharing application program. Window 86 provides an area in which to display objects that the user shares between source terminal 12 and destination terminal 14. Scroll bars 88 provide a user with a way to view different areas of the object sharing display window 86.

Figure 5A:
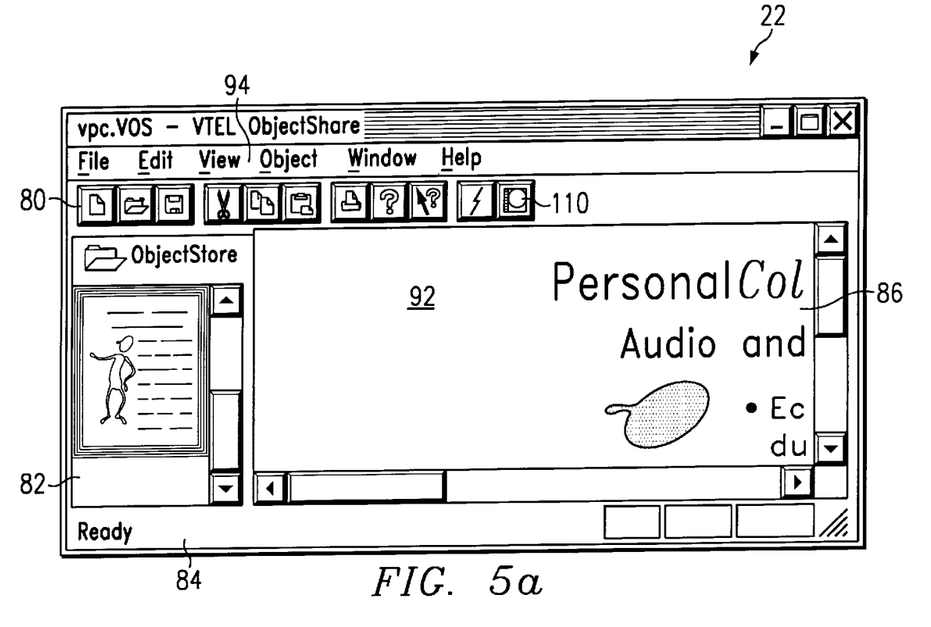
FIGS. 5a through 5c illustrate the user's process flow for changing the view that the present invention provides.
Figure 5B:
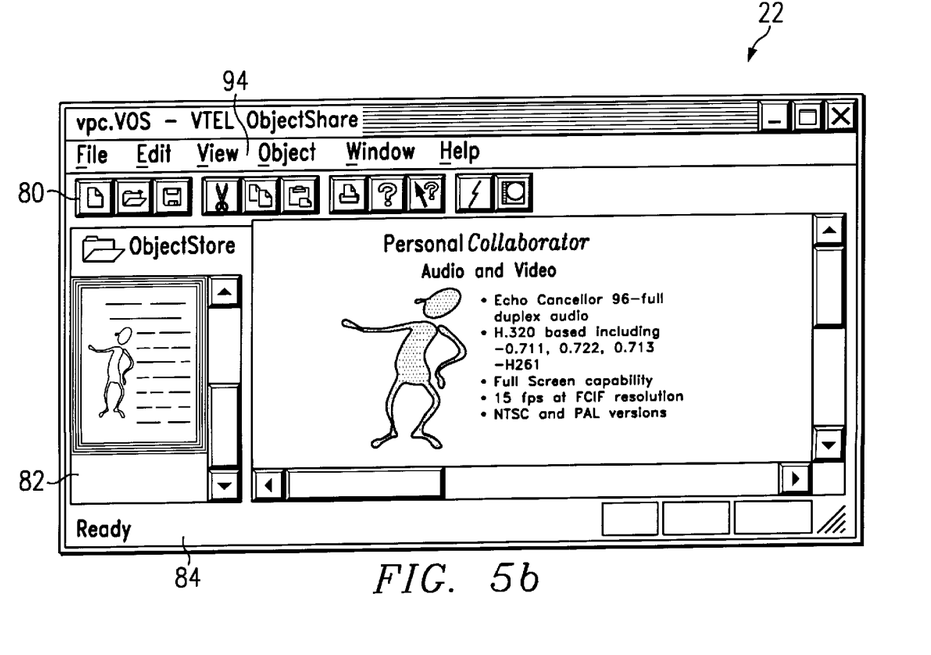
Figure 5C:
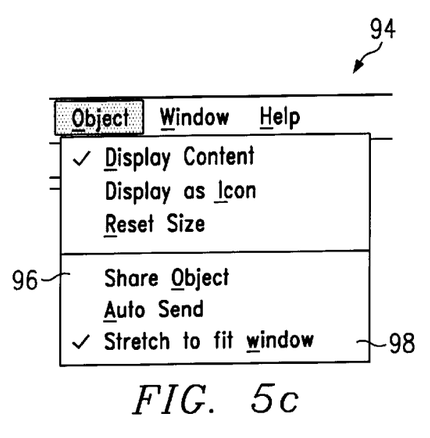

FIGS. 5a through 5c provide various screen applicable to the operation of changing the view within object sharing window 86. The present embodiment permits resizing an object in object share window 86 so that an entire object fits within a window, or so that the user may see a detailed area of the shared image that the object represents. When placing an object within object sharing window 86, object sharing window 86 displays a detailed view of the image. Using horizontal and vertical scroll bars 88 and 90 it is possible to see different areas of the image. Object option 94 provides menu 96 by which a user may select the "stretch to fit" window function 98 to permit viewing the entire object 92 within object share window 96.

Figure 6:
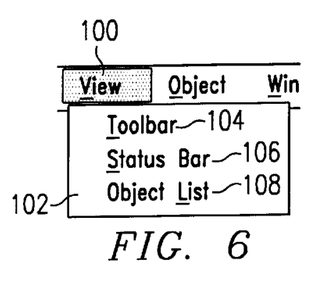
FIG. 6 provides the menu applicable to one embodiment for increasing the view that the present invention makes possible.
Figure 7:
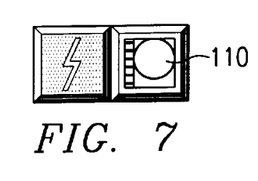
FIG. 7 shows the icon of the present invention for maximizing the view of a shared object according to the present invention.

FIG. 6 illustrates, for view option 100 the menu 102 for maximizing the viewing area of a given transferred object at destination terminal 14. Thus, when the user receives a presentation and desires to maximize the viewing area of object sharing window 86, the user may close object store window 82 and turn off toolbar 80 as well as status bar 84. This may be accomplished by the user de-selecting toolbar option 104, status bar option 106, and option list option 108 from view menu 102 of view option 100. Alternatively, using full screen button 110 of FIG. 7 which appears on toolbar 80, it is possible to maximize object sharing window 86. To return object sharing window 86 to a detailed view, the present invention permits simply clicking the input device.

Figure 8:
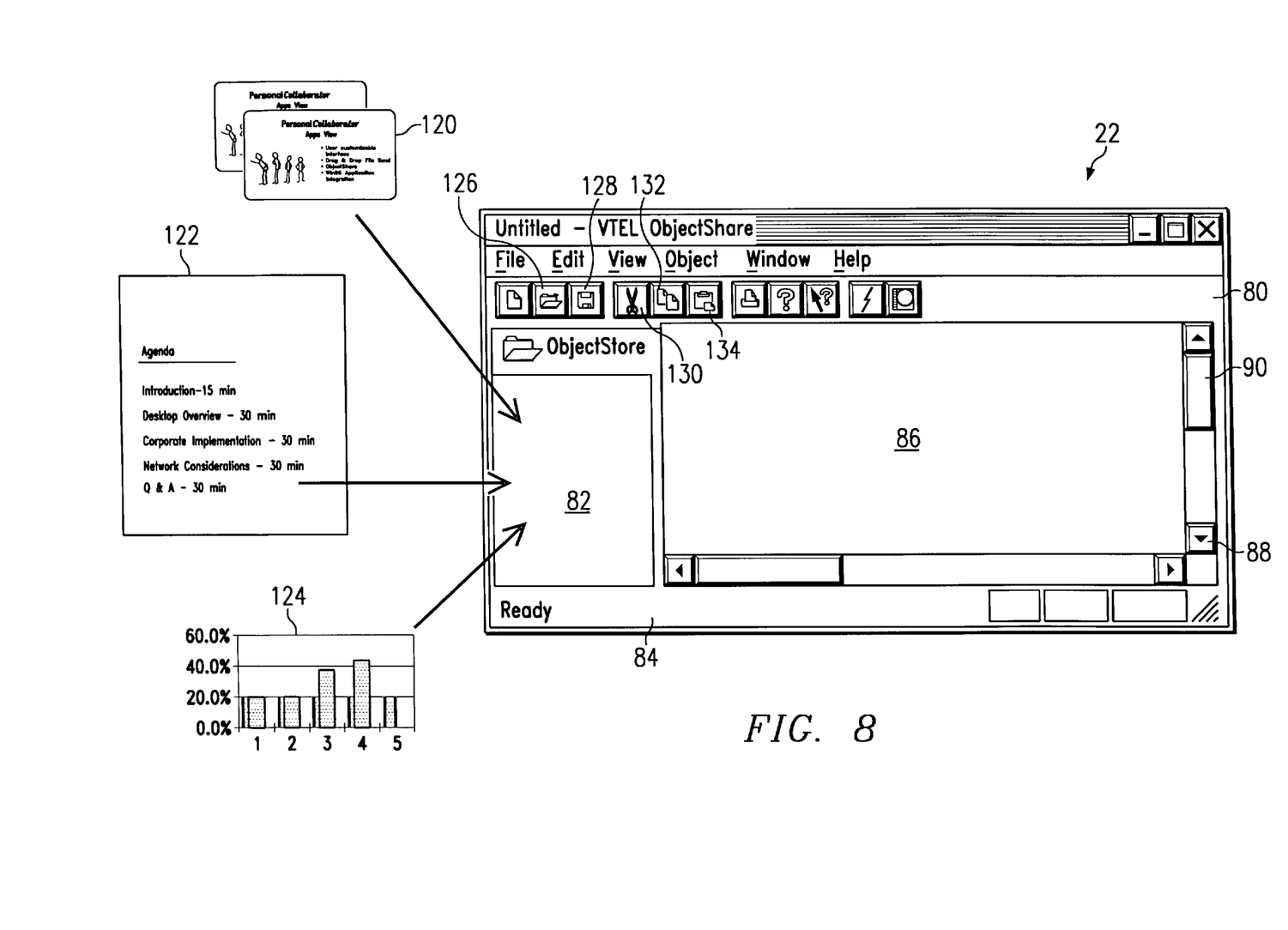
FIG. 8 illustrates the various types of objects that may go into a shared object presentation that the present invention makes possible.

FIG. 8 depicts the process of creating an object sharing presentation according to the present object sharing application. The result is to put an object such as presentation slide object 120, document object 122, and/or graph object 124 in object storing window 82. By running the application on destination terminal 14, it is possible to share the desired object from source terminal 12 to destination terminal 14. The user selects the object that the user desires to share and drags it into object storing window 82.

Figure 9:
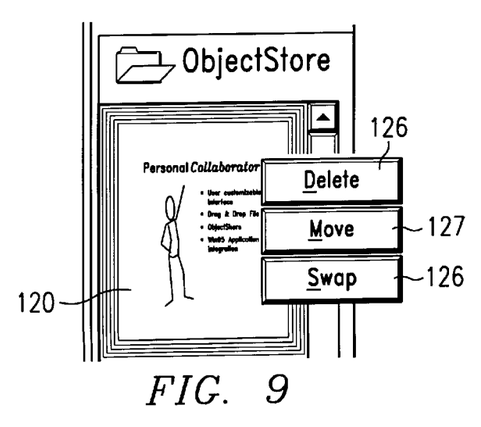
FIG. 9 depicts the operation icon for deleting an object from the shared object window of the present invention.

FIG. 9 shows that with an object such as object 120 within object storing window 82, it is possible to delete that object using delete button 126. By placing a cursor on object 120, the user may click the right mouse button, for example, to delete object 20. In addition, FIG. 9 shows that the present object sharing application permits moving an object, using move button 127, and swapping a selected object with another object, using swap button 129.

Figure 10:
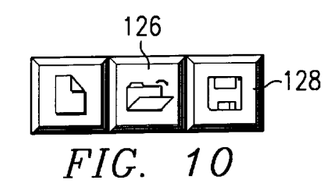
FIG. 10 gives one possible configuration of the icons for opening and saving a shared object presentation that the present invention makes possible.

FIG. 10 shows the use of buttons 126 and 128 for saving and opening an object share presentation. After creating a presentation, for example, in object storing window 82, by pressing button 128 it is possible to store in the computer memory the object sharing application. Then, using button 126 it is possible to open a stored object sharing application.

Figure 11:
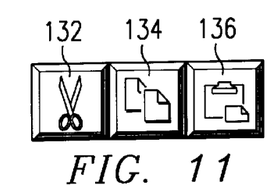
FIG. 11 provides the icons for cutting, copying and pasting an image according to one embodiment of presenting invention.

The present embodiment, as FIG. 11 indicates, provides the ability to cut, copy, and paste images in object sharing window 82. Once an image is in object sharing window 82, the user may cut, copy, and paste images to and from object sharing window 82. When the user cuts or copies an image in object sharing window 82, the image goes to a clipboard such as the Windows 95® clipboard. From the Windows 95® clipboard the user may paste it to other applications. The user may also paste images from the clipboard into object share window 82. Thus, button 132 of FIG. 11 provides a way to cut or delete objects from object sharing window 82. Copy button 134 copies objects from object sharing window 82 into a clipboard such as a Windows 95® clipboard. Paste button 136 pastes objects from the clipboard into object sharing window 82.

Figure 12:
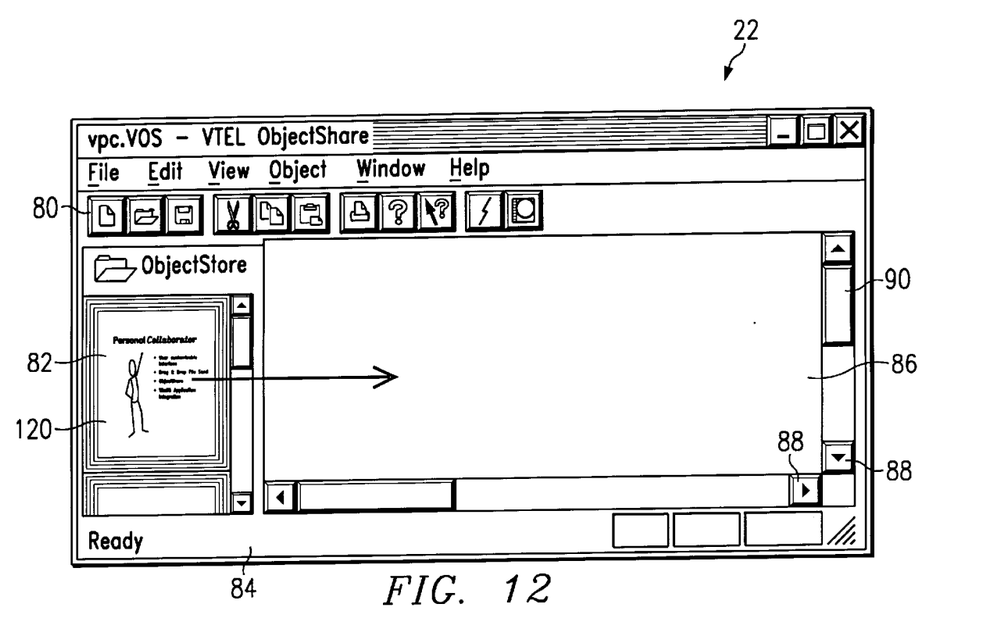
FIG. 12 presents the screen for sending video images from the shared object window in one embodiment of the present invention.
Figure 13:
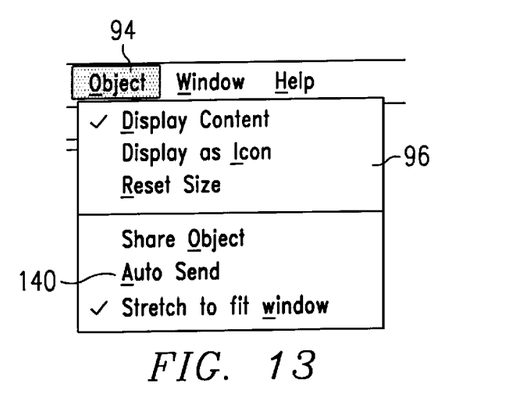
FIG. 13 shows the feature for turning off an auto send operation of the present invention.
Figure 14:
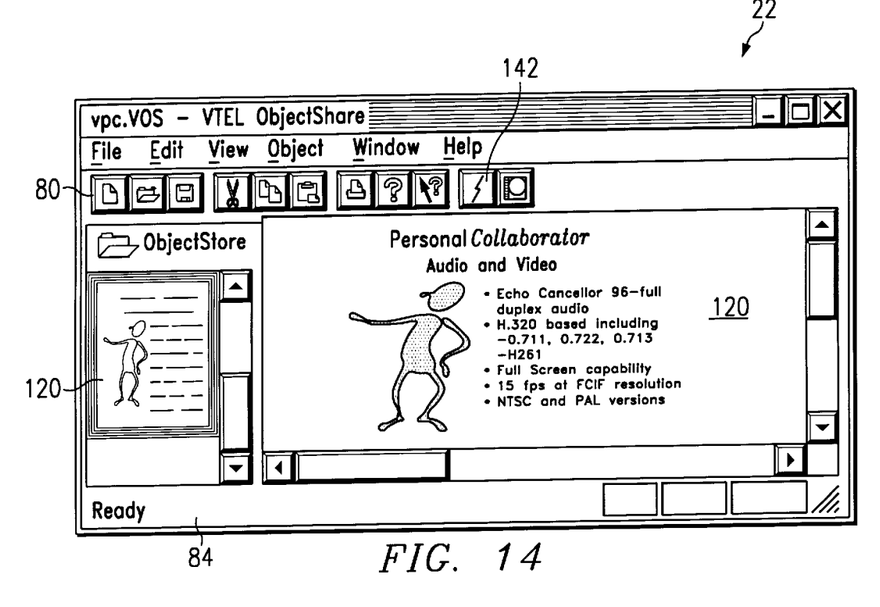
FIG. 14 gives one screen applicable to the function of sending an image when the automatic sending feature of the present invention is turned off.

FIG. 12 shows screen 22 for sending video images from object sharing window 82. The user may configure the object sharing application so that objects that the user places in object sharing window 82 are automatically sent to destination terminal 14. Alternatively, the user may disable autosend functions so that objects are sent only at the user's discretion. By collecting the object in object storing window 82 and dragging the object into object share window 86, the object is automatically sent to the remote site. To turn off the automatic sending function, using object option 94, the user may deselect the autosend function by clicking autosend option 140 from object option menu 96. When autosend function 140 is off, the user, using share button 142, may send the object 120 to the remote location.

Figure 15:
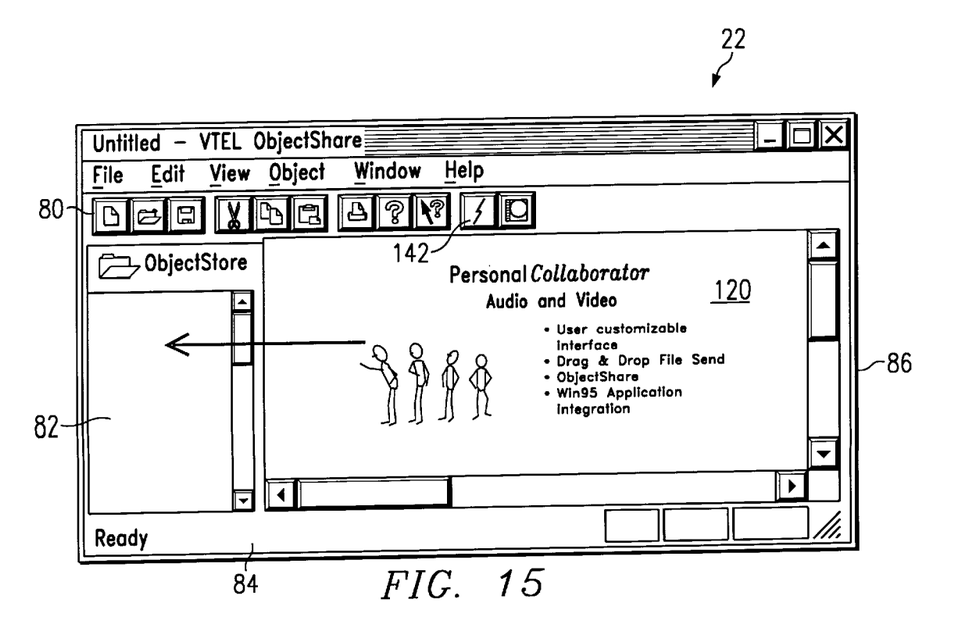
FIG. 15 illustrates the screen applicable to the operation of saving images that a source terminal sends to a destination terminal.

FIG. 15 illustrates the steps for saving images from the remote terminal. When the remote site, such as source terminal 12, sends an image, the image is displayed in object sharing window 86. To save the image, the user would drag and drop the image to object storing window 82. There are numerous other operations that the present invention makes possible, the above being only examples.

The present object sharing application provides the ability to save the objects automatically as remote location 14 receives them. This allows the user to simply watch or receive a presentation. Then, by actuating a control button, the user may receive all of the presentation in object store slide tray 120.

To implement this feature, the user clicks on the full screen button and turns on the option to AutoSave, which is a menu option. Then the user may watch the presentation of data. As the user at source terminal 12 presents data, such as drawings or documents, behind the scenes, the present object sharing application saves the data in object storing application 120. At the end of the teleconference, the user at destination terminal 14 receives a prompt to name the file to save the data.

Another feature of the present invention is the ability to launch an application that creates data at source terminal 12 for editing the transmitted object at destination terminal 14. Therefore, if a user receives an object and desires to edit that object, instead of having to drag and drop the object or to cut and paste the object from a clipboard into an application program at destination terminal 14, the present invention permits simply double clicking the input device to launch the same application that created the data. According, both the user at destination terminal 14 and the user at source terminal 12 share the same application. There is no need to operate a separate application at destination terminal 14.

Although the invention has been described in detail herein with reference to the illustrative embodiments, it is to be understood that this description is by way of example only and is not to be construed in a limiting sense. It is to be further understood, therefore, that numerous changes in the details of the embodiments of the present object sharing method and system and additional embodiments of the invention, will be apparent to, and may be made by, persons of ordinary skill in the art having reference to this description. It is contemplated that all such changes and additional embodiments are within the spirit and true scope of the invention as claimed below.

What is claimed is:

1. A method of sharing an object in a teleconferencing communications environment, comprising the steps of:

establishing a teleconference session between a source terminal having a source terminal application program and a destination terminal having at least one destination terminal application program;

identifying an object comprising a plurality of attributes, said object having at least one link to the source terminal application program;

sharing said object between said source terminal and said destination terminal during said teleconferencing session without transferring said source terminal application program from said source terminal by streaming data from the source terminal to the destination terminal to create said object at the destination terminal, so that said destination terminal may associate said object with at least one destination terminal application program.

2. The method of claim 1, wherein said identifying step further comprises the step of identifying an object comprising a plurality of attributes, said object having at least one link to the source terminal application program, said source terminal application program comprising a graphical presentation application program associated with said source terminal.

3. The method of claim 1, wherein said identifying step further comprises the step of identifying an object comprising a plurality of attributes, said object having at least one link to the source terminal application program, said source terminal application program comprising a word processing application program associated with said source terminal.

4. The method of claim 1, wherein said sharing step further comprises the step of sharing said object between said source terminal and said destination terminal during said teleconferencing session without sharing said source terminal application program with the destination terminal, said destination terminal application program comprising an application program distinct from said source terminal application program.

5. The method of claim 1, wherein said sharing step further comprises the step of dragging and dropping an object directly from said source terminal application program into a window for sharing said object during a teleconferencing call.

6. The method of claim 1, wherein said identifying step further comprises the step of identifying a plurality of objects each comprising a plurality of attributes, said plurality of objects having a plurality of links to a plurality of source terminal application programs associate with said source terminal, and further wherein such sharing step comprises the step of sharing said plurality of objects between said source terminal and said destination terminal during said teleconferencing session without sharing said plurality of source terminal application programs from said source terminal, so that said destination terminal may associate said plurality of objects with a plurality of destination terminal application programs, said plurality of destination terminal application programs being separate from said plurality of source terminal application programs.

7. The method of claim 1, further comprising the step of making available to a user said object for editing said object at said destination terminal.

8. The method of claim 1, further comprising the step of positioning said object in association with said destination terminal application program in a whiteboard so that a user may specifically direct attention to particular portions of said object at said destination terminal.

9. The method of claim 1, further comprising the step of saving said objects automatically at said destination terminal.

10. The method of claim 1, further comprising the step of sharing said object between said source terminal and said destination terminal during said teleconferencing session while sharing said source terminal application program from said source terminal without transferring said source terminal application program from said source terminal to said destination terminal.

11. A teleconferencing communications system for teleconferencing between a source terminal having a source terminal application program and a destination terminal having a destination terminal application program, comprising:

teleconferencing instructions for establishing a teleconference session between the source terminal and the destination terminal;

object identifying instructions for identifying an object comprising a plurality of attributes, said object having at least one link to the source terminal application program;

object sharing instructions for sharing said object between said source terminal and said destination terminal during said teleconferencing session without sharing said source terminal application program from said source terminal by streaming data from the source terminal to the destination terminal to create said object at the destination terminal, so that said destination terminal may associate said object with at least one destination terminal application program.

12. The system of claim 11, wherein said identifying instructions further comprise instructions for identifying an object comprising a plurality of attributes, said object having at least one link to the source terminal application program, said source terminal application program comprising a graphical presentation application program, said source terminal application program associated with said source terminal.

13. The system of claim 11, wherein said identifying instructions further comprise instructions for identifying an object comprising a plurality of attributes, said object having at least one link to the source terminal application program, said source terminal application program comprising a word processing application program, said source terminal application program associated with said source terminal.

14. The system of claim 11, wherein said object sharing instructions further comprise instructions for sharing said object between said source terminal and said destination terminal during said teleconferencing session without sharing said source terminal application program, said source terminal application program comprising a first type of application program, said object sharing instructions further comprising instructions for said destination terminal to associate said object with the destination terminal application program, said destination terminal application program comprising a second type of application program distinct from said first type of application program, said at least one destination terminal application program being separate from said source terminal application program.

15. The system of claim 11, wherein said object sharing instructions further comprise instructions for dragging and dropping an object directly from said source terminal application program into a window for sharing said object during a teleconferencing call.

16. The system of claim 11, wherein said identifying instructions further comprise instructions for identifying a plurality of objects each comprising a plurality of attributes, said plurality of objects having a plurality of links to a plurality of source terminal application programs associated with said source terminal, and further wherein such sharing step comprises instructions for sharing said plurality of objects between said source terminal and said destination terminal during said teleconferencing session without sharing said plurality of source terminal application programs from said source terminal, so that said destination terminal may associate said plurality of objects with a plurality of destination terminal application programs, said plurality of destination terminal application programs being separate from said plurality of source terminal application programs.

17. The system of claim 11, further comprising instructions for making available to a user said object for editing said object at said destination terminal.

18. The system of claim 11, further comprising instructions for positioning said object in association with said destination terminal application program in a whiteboard so that a user may specifically direct attention to particular portions of said object at said destination terminal.

19. The method of claim 11 further comprising the step of saving said objects automatically at said destination terminal.

20. The method of claim 10, further comprising the step of sharing said object between said source terminal and said destination terminal during said teleconferencing session while sharing said source terminal application program from said source terminal without transferring said source terminal application program from said source terminal to said destination terminal.

21. A teleconferencing system for conducting a teleconference, comprising:
  at least one source terminal for originating a teleconference;
  at least one destination terminal for receiving data from said at least one source terminal in supporting said teleconference;
  a telecommunications medium for permitting communications between said at least one source terminal and said at least one destination terminal; and
  an object sharing application associated with said at least one source terminal and said destination terminal for sharing an object between said at least one source terminal and said at least one destination terminal, said object sharing application comprising:
    teleconferencing instructions for establishing a teleconference session between said at least one source terminal and said at least one destination terminal;
    object identifying instructions for identifying an object comprising a plurality of attributes, said object having at least one link to said at least one source terminal application program associated with said at least one source terminal;
    object sharing instructions for sharing said object between said at least one source terminal and said destination terminal during said teleconferencing session without sharing said at least one source terminal application program from said at least one source terminal by streaming data from the source terminal to the destination terminal to create said object at the destination terminal, so that said destination terminal may associate said object with at least one destination terminal application program, said at least one destination terminal application program being separate from said at least one source terminal application program.

22. The system of claim 21, wherein said identifying instructions further comprise instructions for identifying an object comprising a plurality of attributes, said object having at least one link to said at least one source terminal application program, said at least one source terminal application program comprising a graphical presentation application program, said at least one source terminal application program associated with said at least one source terminal.

23. The system of claim 21, wherein said identifying instructions further comprise instructions for identifying an object comprising a plurality of attributes, said object having at least one link to at least one source terminal application program, said at least one source terminal application program comprising a word processing application program, said at least one source terminal application program associated with said at least one source terminal.

24. The system of claim 21, wherein said object sharing instructions further instructions for sharing said object between said at least one source terminal and said destination terminal during said teleconferencing session without sharing said at least one source terminal application program, said at least one source terminal application program comprising a first type of application program, said object sharing instructions further comprising instructions for said destination terminal to associate said object with at least one destination terminal application program, said destination terminal application program comprising a second type of application program distinct from said first type of application program, said at least one destination terminal application program being separate from said at least one source terminal application program.

25. The system of claim 21, wherein said object sharing instructions further comprise instructions for dragging and dropping an object directly from said at least one source terminal application program into a window for sharing said object during a teleconferencing call.

26. The system of claim 21, wherein said identifying instructions further comprise instructions for identifying a plurality of objects each comprising a plurality of attributes, said plurality of objects having a plurality of links to a plurality of source terminal applications programs associates with said source terminal, and further wherein such sharing step comprises instructions for sharing said plurality of objects between said source terminal and said destination terminal during said teleconferencing session without sharing said plurality of source terminal application programs from said source terminal, so that said destination terminal may associate said plurality of objects with a plurality of destination terminal application programs, said plurality of destination terminal application programs being separate from said plurality of source terminal application programs.

27. The system of claim 21, further comprising instructions for making available to a user said object of said destination terminal for editing said object at said destination terminal.

28. The system of claim 21, further comprising instructions for positioning said object in association with said destination terminal application programs in a whiteboard so that a user may specifically direct attention to particular portions of said object at said destination terminal.

29. The system of claim 21, further comprising the step of saving said objects automatically at said destination terminal.

30. The system of claim 21, further comprising the step of sharing said object between said source terminal and said destination terminal during said teleconferencing session while sharing said source terminal application program from said source terminal without transferring said source terminal application program from said source terminal to said destination terminal.

* * * * *